United States Patent [19]
Skalka

[11] Patent Number: 5,660,907
[45] Date of Patent: Aug. 26, 1997

[54] REINFORCED STRUCTURAL MEMBER OF RECYCLED PLASTIC

[75] Inventor: Gerald P. Skalka, Potomac, Md.

[73] Assignee: Victor Stanley, Inc., Dunkirk, Md.

[21] Appl. No.: 472,846

[22] Filed: Jun. 7, 1995

Related U.S. Application Data

[63] Continuation of Ser. No. 203,553, Mar. 1, 1994, abandoned.

[51] Int. Cl.⁶ ........................................... B32B 3/30
[52] U.S. Cl. .................. 428/67; 52/630; 52/309.16;
52/309.7; 428/57; 428/58; 428/105; 428/114;
428/167; 428/168; 428/172; 428/903.3
[58] Field of Search ..................... 428/67, 167, 168,
428/172, 903.3, 57, 58, 105, 114; 52/309.7,
309.16, 630, 793

[56] References Cited

U.S. PATENT DOCUMENTS

| | | | |
|---|---|---|---|
| 2,645,115 | 7/1953 | Abeles | 52/223.9 |
| 3,201,862 | 8/1965 | Gotoh | 29/470.1 |
| 3,470,598 | 10/1969 | Berthelsen | 29/897.342 |
| 3,556,918 | 1/1971 | Lemelson | 428/114 |
| 3,928,691 | 12/1975 | Knudson | 428/53 |
| 4,074,412 | 2/1978 | Miskic | 264/251 |
| 4,083,916 | 4/1978 | Chasse | 428/67 |
| 4,188,765 | 2/1980 | Jackson | 52/716 |
| 4,260,655 | 4/1981 | Zoller | 428/114 |
| 4,341,831 | 7/1982 | Kleiss | 428/188 |
| 4,476,174 | 10/1984 | Carrera | 428/67 |
| 4,756,948 | 7/1988 | Kuramochi | 428/167 |
| 4,944,416 | 7/1990 | Petersen et al. | 211/87 |
| 4,945,595 | 8/1990 | Meriweather | 14/69.5 |
| 4,947,600 | 8/1990 | Porter | 52/235 |
| 4,961,298 | 10/1990 | Nogradi | 52/235 |
| 5,085,912 | 2/1992 | Algiere | 428/67 |
| 5,096,645 | 3/1992 | Fink | 264/137 |
| 5,106,666 | 4/1992 | Fitzgerald | 428/67 |
| 5,269,109 | 12/1993 | Gulur | 52/309.9 |
| 5,353,562 | 10/1994 | Decker | 52/309.7 |
| 5,488,650 | 1/1996 | Centa | 52/288.1 |

FOREIGN PATENT DOCUMENTS

| | | | |
|---|---|---|---|
| 2420424 | 11/1979 | France | 428/173 |
| 7700697 | 7/1978 | Netherlands . | |
| 2 036 148 | 6/1980 | United Kingdom . | |

Primary Examiner—Nasser Ahmad
Attorney, Agent, or Firm—Reid & Priest LLP

[57] ABSTRACT

A reinforced structural member comprising a solid structural member of recycled plastic having a reinforcing bar inserted therein, extending inwardly from one surface. A notch is formed in the solid structural member extending inwardly with respect to the surface against which force is to be exerted. An untensioned reinforcing bar formed of a material having characteristics of resilience and compressibility different from that of the structural member is inserted and locked into the notch. The reinforcing bar is complementary in shape to the notch, and is held in place by the density of the solid structural member and fasteners such as screws. In this way, two dissimilar materials, neither of which alone has sufficient strength, rigidity, or "memory" can be combined to create a durable, inexpensive set of components which substantially exceed the mechanical qualities of either material by itself.

36 Claims, 3 Drawing Sheets

REINFORCED STRUCTURAL MEMBER OF RECYCLED PLASTIC

This is a continuation of U.S. patent application Ser. No. 08/203,553, filed Mar. 1, 1994, now abandoned.

BACKGROUND OF THE INVENTION

1. Field of the Invention

The present invention relates to composite structural units. More specifically, the invention relates to a reinforced structural member of recycled plastic and a method for making such a structural member.

2. Related Art

Because wood is subject to splintering, rotting, discoloration, attack by insects, and other undesirable effects upon long-term exposure to the elements, plastic has been substituted for wood in a number of outdoor applications, particularly furniture and related accessories. As the public has become more conscious of the need for conservation, there have been attempts to employ recycled plastics in making outdoor furniture, accessories, decking, walkways, etc.

Unfortunately, recycled plastic in the form required for outdoor furniture, such as slats for benches, has limited strength when subjected to such forces as may be incurred under ordinary use; and is extremely subject to deformation when subjected to relatively low heat and stress, such as may be experienced during the warmer months. Thus, furniture of recycled plastic tends to sag and not recover after only a short period of use.

This problem of sag can be avoided by using a very high density plastic. However, very high density plastic is prohibitively expensive, does not address the societal need to recycle, and requires the use of large amounts of virgin material.

It is known to reinforce extruded or molded plastic members with imbedded elements wherein the elements provide the member with a higher strength, and the plastic material provides resistance to corrosion, an attractive appearance, and protects the element.

U.S. Pat. No. 5,096,645 issued to Fink teaches that extruded thermoplastic members, particularly structural members, can be reinforced by longitudinally extending pre-stressed elements, such as filaments or matting. The elements, while under tension, are drawn into an extrusion crosshead die forming the thermoplastic member. The elements are fully imbedded within the thermoplastic material while under tension. Curing of the thermoplastic material, and final curing of the tensioned reinforcing elements, if a thermosetting resin impregnated element is used, occurs while the elements are under tension. The material of the member and the elements intimately bond and the tension forces within the elements reinforce the member at the desired locations.

U.S. Pat. No. 3,928,691 issued to Knudson teaches a polyurethane panel system having mutually opposing, longitudinally extending, semi-circular grooves for receiving metallic reinforcing rolls. The rolls are disposed between the edges of adjacent panels, the panels being secured together using an epoxy resin.

U.S. Pat. No. 3,470,598 issued to Berthelsen provides a structural member made of plastic which is extruded over a metallic reinforcement. The method of producing such composite structure comprises the steps of punching perforations of selective sizes and varying spacing in respective portions of a continuous length of a metallic sheet strip, rolling the strip into the form of a desired profile with the curved portions of the profile containing more widely spaced perforations than the flat portions, and extruding synthetic resin to effectively cover opposite surfaces of the metallic profile with opposite layers which are connected through the perforations of the metallic strip.

U.S. Pat. No. 2,645,115 issued to Abeles teaches a structural member comprising a plurality of aligned blocks having a single continuous groove and a metallic reinforcing member under tension disposed therein. In one embodiment, the structural member is made of plastic.

Netherlands Patent No. 7,700697 provides an extruded hollow plastic member having an internally disposed metallic reinforcement. The plastic member is typically made by extrusion.

All of the foregoing patents teach a pre-stressing of reinforcing elements within plastic materials, or otherwise require manufacturing or assembly steps which are fairly complicated and expensive.

SUMMARY OF THE INVENTION

Thus, it is an object of the invention to provide a plastic structural element useful for outdoor and indoor applications and in other applications where a wood substitute may be desirable, which is reinforced to prevent sagging due to exposure to the forces of normal use.

Another object of the invention is to provide a plastic structural member which can be formed by extrusion and which is reinforced using an insert member without the need for tensioning the insert member.

It is another object of the invention to provide a plastic structural member with an insert member having characteristics of resilience and compressibility different from those of the plastic in which the different characteristics of the plastic and the material of the insert member cause the insert member to reinforce the plastic structural member, while the beneficial characteristics of the plastic (its relative incompressibility) prevent deformation of the insert member in its weaker cross-section.

It is still another object of the invention to provide a reinforced structural member comprising two dissimilar materials put together in an odd geometry to create a resilience and memory which neither one alone possesses.

It is an additional object of the invention to provide a method of making a plastic structural member having an insert member.

These and other objects of the invention are achieved by the provision of a reinforced structural member comprising a plastic structural member having a metallic insert member or bar inserted therein without tension or pre-stressing.

The present invention takes advantage of the relative characteristics of plastics and metal, and particularly recycled plastics and steel. Plastic materials, particularly extruded recycled plastic materials, have limited compressibility and are relatively dense. Such plastic materials have some rigidity and strength in their major plane, but very little, if any, resilience in their minor plane. In contrast, metal, and steel in particular, is resilient and rigid in the major plane. Both plastic and metal are relatively weak and are less resilient in their minor plane.

As used herein, the major plane of an object is defined with reference to the direction in which force will be exerted on the structural member in use; specifically the major plane is defined as a plane which is perpendicular to the direction of the force. The minor plane of an object, as used herein, is a plane perpendicular to the major plane.

Metal, and particularly steel, can be used to advantage in reinforcing plastic materials, and structural members of recycled plastics in particular. The limited incompressibility of the plastic structural member prevents flexing of an elongated steel insert member in the minor plane of the steel insert member, while the rigidity of the steel insert bar or member prevents flexing of the plastic structural member in the minor plane of the plastic structural member. Thus, the metal insert member can be inserted into the plastic structural member without the need for tensioning or prestressing, contrary to the prior art.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
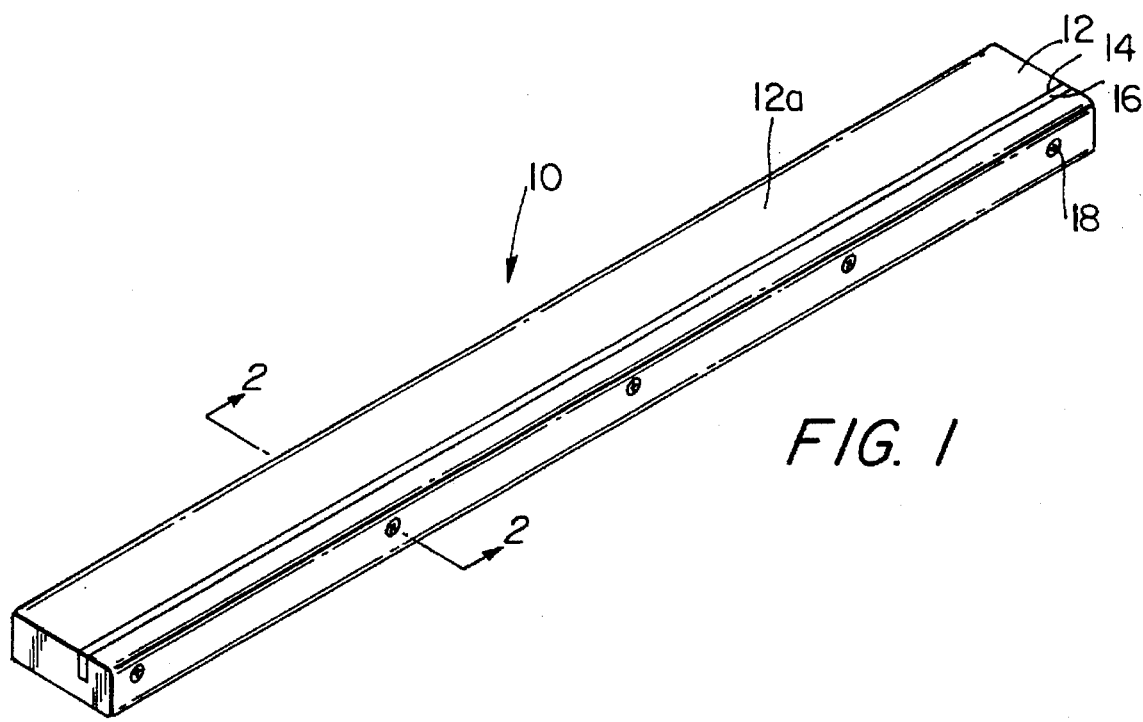
FIG. 1 is a perspective view illustrating a first embodiment of the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

FIGS. 1–4 illustrate first and second embodiments of a reinforced structural member 10 and 100, respectively, utilizing the concepts of the invention. As shown in FIGS. 1–4, plastic is extruded to form a solid structural member 12. The plastic can be all recycled, a combination of recycled and virgin, or all virgin. As illustrated in FIGS. 1–4, structural member 12 is a rectangular prism. However, it should be understood that other shapes can be employed, including but not limited to triangular prismatic, square prismatic, pentagonal prismatic, cylindrical etc. Solid structural member 12 has a surface 12a defining a major plane.

Figure 2:
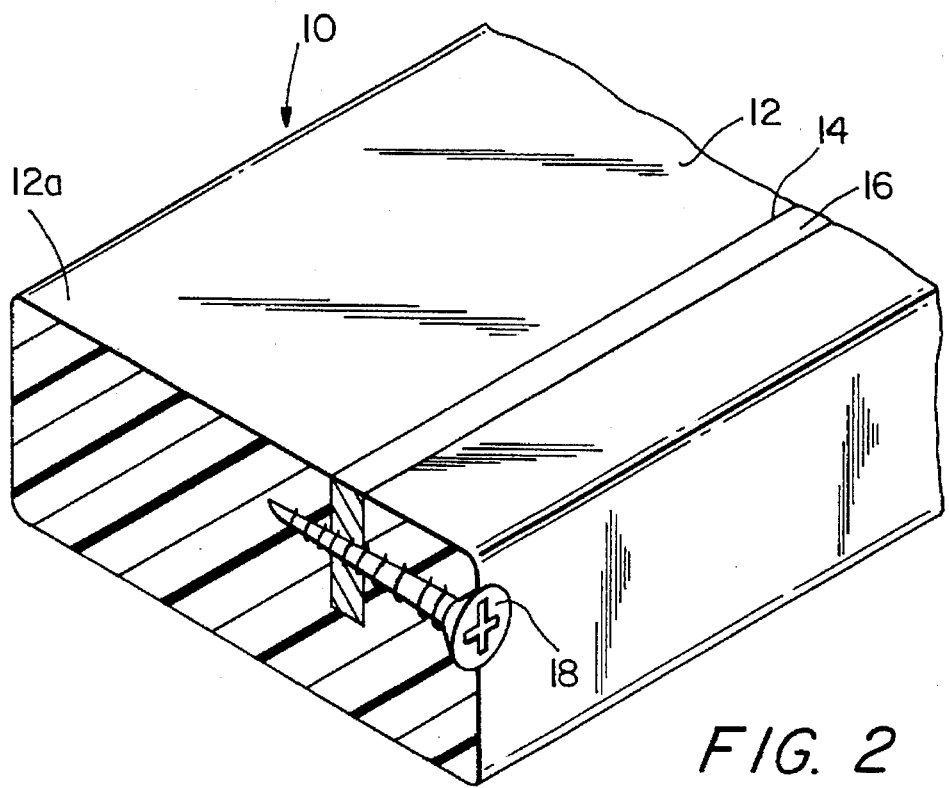
FIG. 2 is a perspective view partially in cross-section as taken along line 2—2 of FIG. 1.

In the first embodiment of the invention, shown in FIGS. 1 and 2, the major plane coincides with one of the wider sides of structural member 12, thus making reinforced member 10 suitable for use as, for example, a slat in a conventional garden bench, picnic table, or bench, or a plank for a deck. In the second embodiment of the invention, shown in FIGS. 3 and 4, the major plane coincides with one of the narrower sides of the structural member 12, thus making reinforced member 100 suitable for use as, for example, a beam supporting the planks of a deck.

Figure 3:
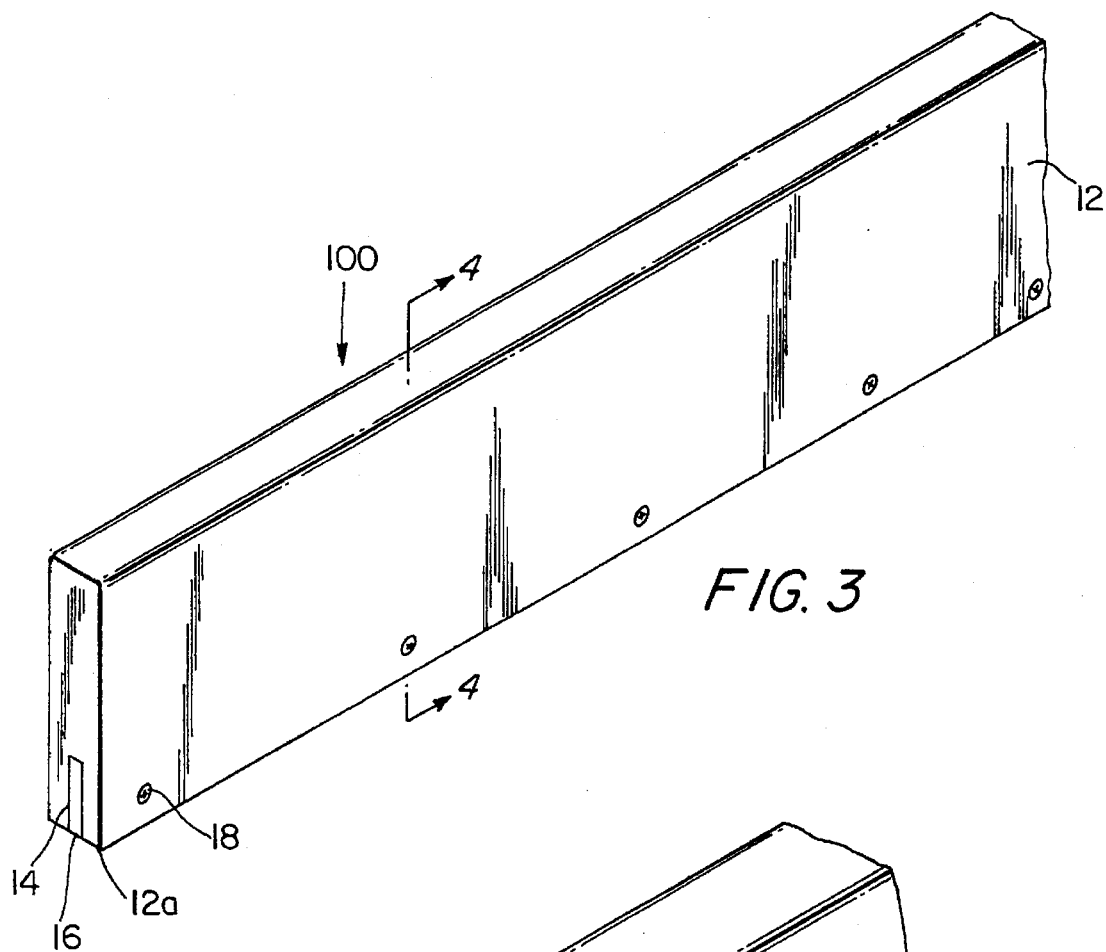
FIG. 3 is a perspective view illustrating a second embodiment of the invention.
Figure 4:
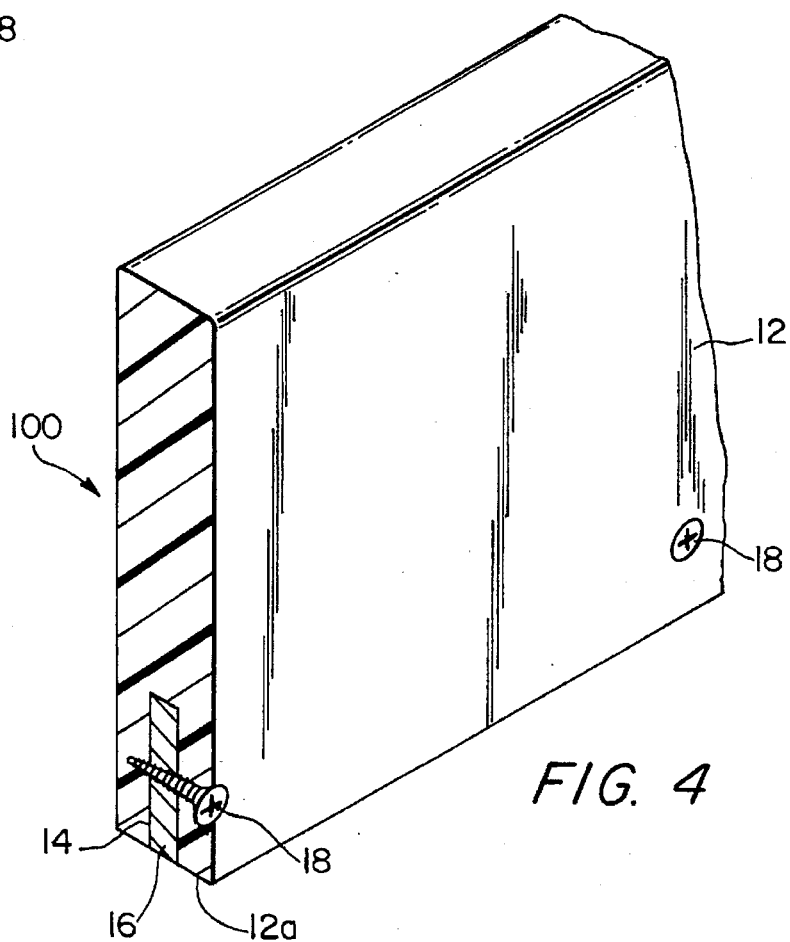
FIG. 4 is a perspective view partially in cross-section as taken along line 4—4 of FIG. 3.
Figure 4A:
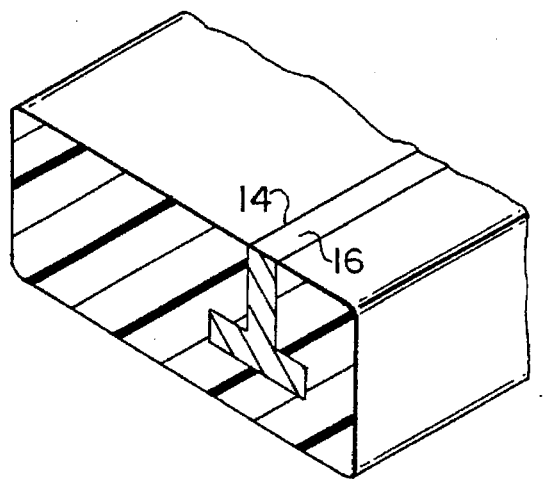
FIG. 4A is a perspective view partially in cross-section of a third embodiment of the invention.
Figure 4B:
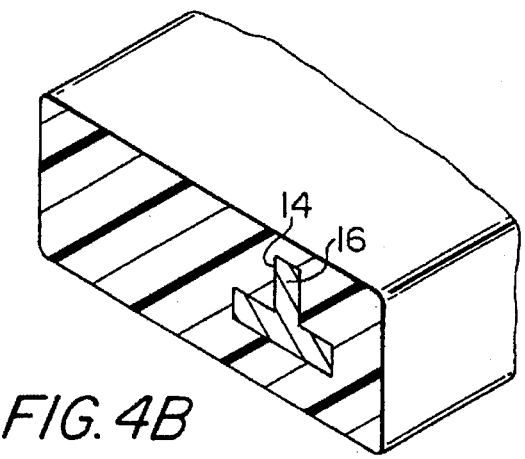
FIG. 4B is a perspective view partially in cross-section of a fourth embodiment of the invention.
Figure 5A:
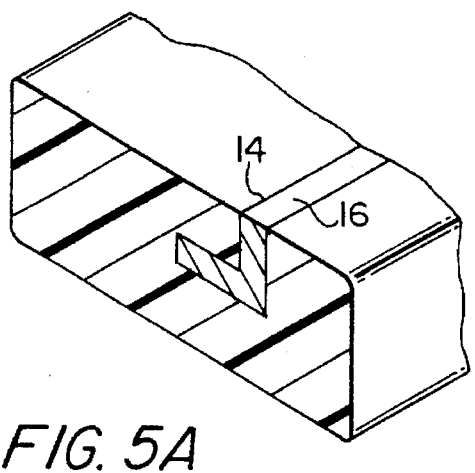
FIG. 5A is a perspective view partially in cross-section of a fifth embodiment of the invention.
Figure 5B:
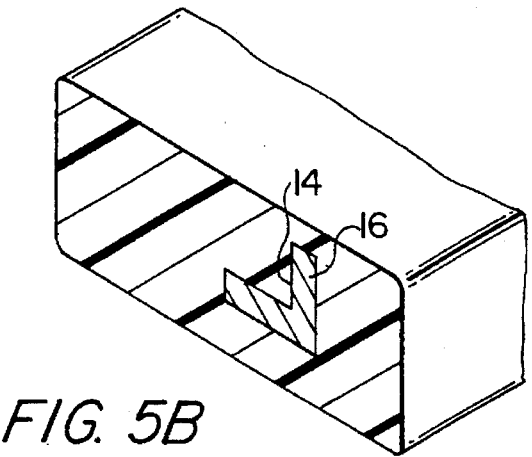
FIG. 5B is a perspective view partially in cross-section of a sixth embodiment of the invention.

A notch 14 is formed in solid structural member 12 by milling or other means, extending inwardly with respect to the surface 12a which defines the major plane. As shown in FIGS. 1–4, the outermost edge of notch 14 is contiguous with surface 12a. However, as shown in FIGS. 4B and 5B the outermost edge of, notch 14 can also be recessed from the surface.

Notch 14 has a dimension extending parallel to the direction of force, and perpendicular to surface 12a of solid structural member 12. Thus, in the first embodiment of the invention as shown in FIGS. 1 and 2, the side edges of notch 14 are perpendicular to a wide side of structural member 12, while in the second embodiment of the invention as shown in FIGS. 3 and 4, the outermost edge of notch 14 are perpendicular to a narrow side of structural member 12. As shown in FIGS. 1–4, notch 14 has a rectangular prismatic shape. However, as will be described in greater detail below with respect to FIGS. 4A, 4B, 5A, and 5B, notch 14 can be T-shaped, L-shaped, or even corrugated (i.e., sinusoidal). In the case of those shapes also, the outermost edge of notch 14 can be either contiguous with the surface of structural member 12 or recessed from the surface.

An untensioned reinforcing bar 16 having a shape substantially complementary to that of notch 14 is inserted, for example by being driven, into notch 14 to provide a uniform reinforcement throughout solid structural member 12. Although, as shown in FIGS. 1–4, bar 16 has a rectangular prismatic shape, it can also be T-shaped (as shown in FIGS. 4A and 4B), L-shaped (as shown in FIGS. 5A and 5B), or corrugated complementary to the shape of notch 14, so that bar 16 is matingly received in notch 14, where the outermost edge of notch 14 lies flush with surface 12a (as shown in FIGS. 1–4, 4A, and 5A), bar 16 can be dimensioned also so that its outermost edge lies flush with surface 12a, or it can be dimensioned so that its outermost edge is recessed from surface 12a. Where the outermost edge of notch 14 is recessed from surface 12a (as shown in FIGS. 4B and 5B), bar 16 has substantially the same dimensions as notch 14.

Reinforcing bar 16 can be made from recycled metal, for example, recycled steel from old automobile bodies. Although bar 16 preferably is formed of a metal, it can also be formed of any other material, even wood, which has characteristics of resilience and compressibility different from plastic.

Reinforcing bar 16 is locked into notch 14 by the density of solid structural member 12. Reinforcing bar 16 can be further locked into notch 14 by other locking means. For example, as best shown in FIGS. 2 and 4, a plurality of holes or apertures 18 are provided through solid structural member 12, extending from a side of structural member 12 perpendicular to surface 12a and through notch 14. A plurality of holes or apertures 20 are provided through reinforcing bar 16 in alignment with holes or apertures 18 of solid structural member 12. Fasteners such as screws 22 extend through holes or apertures 18 and 20 to affix reinforcing bar 16 in position. In the case where the fasteners are screws 22 are used, preferably, holes or apertures 18 are counterbored, so that the heads of screws 22 will lie flush with the side of structural member 12. However, it will be appreciated by those of skill in the art that other fasteners such as dowels, pegs, etc. can be used in place of screws 22.

Because both reinforcing bar 16 and screws 22 or other fasteners are flush with or recessed from all surfaces of solid structural member 12, reinforced members 10 and 100 are free of protrusions and cosmetically acceptable. Further, the plastic used to form solid structural member 12 can be dyed a variety of colors, and can even be textured and colored to simulate wood, thus increasing the cosmetic acceptability of reinforced members 10 and 100.

A significant aspect of the invention is that the reinforcing bar 16 does not need to be pre-tensioned before insertion into notch 14. Reinforcing bar 18 is locked into notch 14 by a combination of the density of the solid structural member 12 and screws 22 which extend through solid structural member 12 and reinforcing bar 18.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A load supporting reinforced structural member, comprising:

a solid structural member of relatively incompressible plastic having a surface defining a major plane, said solid structural member having a lengthwise dimension;

a notch formed in said solid structural member extending inwardly with respect to said major plane and having a side edge extending inwardly with respect to said major plane, said notch being elongated along said lengthwise dimension of said solid structural member; and an untensioned reinforcing bar formed from a material having characteristics of resilience and compressibility different from those of said solid structural member, said bar being embedded in said notch and being substantially complementary in shape to said notch with the embedded sides of said reinforcing bar being in direct contact with the sides of said notch, and said bar also being elongated along said lengthwise dimension of said solid structural member, the relative characteristics of resilience and compressibility of said structural member and said reinforcing bar being such that said reinforced structural member is less subject to deformation and has greater resilience and strength than either said solid structural member or said reinforcing bar alone, and is of sufficient strength to permit its usage as a load support in place of a wooden structural member.

2. The reinforced structural member of claim 1, wherein said notch has an outermost edge which is flush with said surface defining said major plane.

3. The reinforced structural member of claim 2, wherein said bar has an outermost edge which is also flush with said surface defining said major plane.

4. The reinforced structural member of claim 1, wherein said notch has an outermost edge which is recessed from said surface defining said major plane.

5. The reinforced structural member of claim 1, wherein said solid structural member is made of extruded plastic.

6. The reinforced structural member of claim 1, wherein said solid structural member consists of extruded recycled plastic, extruded virgin plastic, or a combination of extruded recycled and virgin plastic.

7. The reinforced structural member of claim 1, wherein said reinforcing bar is formed of a metal.

8. The reinforced structural member of claim 7, wherein said metal is steel.

9. The reinforced structural member of claim 1, wherein said solid structural member is prismatic in shape in the form of a slat.

10. The reinforced structural member of claim 1, wherein said notch has an outermost edge which is flush with said outer surface.

11. The reinforced structural member of claim 10, wherein said bar has an outermost edge which is also flush with said outer surface.

12. The reinforced structural member of claim 1, wherein said notch has an outermost edge which is recessed from said outer surface.

13. The reinforced structural member of claim 1, wherein said solid structural member is made of extruded plastic.

14. The reinforced structural member of claim 1, wherein said solid structural member consists of extruded recycled plastic, extruded virgin plastic, or a combination of extruded recycled and virgin plastic.

15. The reinforced structural member of claim 1, wherein said reinforcing bar is formed of a metal.

16. The reinforced structural member of claim 15, wherein said metal is steel.

17. The reinforced structural member of claim 1, wherein said reinforcing bar is formed of wood.

18. The reinforced structural member of claim 1, wherein said solid structural member is prismatic in shape in the form of a slat.

19. The reinforced structural member of claim 1, wherein said notch and said bar extend substantially the entire length of said solid structural member.

20. The reinforced structural member of claim 1, wherein said notch and said bar extend substantially the entire length of said solid structural member.

21. A load supporting reinforced structural member, comprising:

a solid structural member of relatively incompressible plastic having an outer surface and a lengthwise dimension;

a notch formed in said solid structural member extending inwardly from said outer surface and having a side edge extending inwardly with respect to said outer surface, said notch being elongated along said lengthwise dimension of said solid structural member; and an untensioned reinforcing bar formed from a material having characteristics of resilience and compressibility different from those of said solid structural member, said bar being embedded in said notch and being substantially complementary in shape to said notch with the embedded sides of reinforcing bar being in direct contact with the sides of said notch, and said bar also being elongated along said lengthwise dimension of said solid structural member, the relative characteristics of resilience and compressibility of said structural member and said reinforcing bar being such that said reinforced structural member is less subject to deformation and has greater resilience and strength than either said solid structural member or said reinforcing bar alone, and is of sufficient strength to permit its usage as a load support in place of a wooden structural member.

22. A load supporting reinforced structural member, comprising:

a solid structural member of relatively incompressible plastic having an outer surface, said solid structural member having a lengthwise dimension, at least some of said plastic being recycled plastic;

a notch formed in said solid structural member extending inwardly from said outer surface, said notch being elongated along said lengthwise dimension of said solid structural member; and an untensioned metal reinforcing bar having characteristics of resilience and compressibility different from those of said solid structural member, said bar being embedded in said notch and being substantially complementary in shape to said notch with the embedded sides of said reinforcing bar being in direct contact with the sides of said notch, and said bar also being elongated along said lengthwise dimension of said solid structural member, the relative characteristics of resilience and compressibility of said structural member and said reinforcing bar being such that said reinforced structural member is less subject to deformation and has greater resilience and strength than either said solid structural member or said reinforcing bar alone, and is of sufficient strength to permit its usage as a load support in place of a wooden structural member.

23. The reinforced structural member of claim 22, wherein said notch has an outermost edge which is flush with said outer surface.

24. The reinforced structural member of claim 23, wherein said bar has an outermost edge which is also flush with said outer surface.

25. The reinforced structural member of claim 24, wherein said notch has an outermost edge which is recessed from said outer surface.

26. The reinforced structural member of claim 22, wherein said plastic is an extruded plastic.

27. The reinforced structural member of claim 22, wherein said metal is steel.

28. The reinforced structural member of claim 22, wherein said solid structural member is prismatic in shape in the form of a slat.

29. The reinforced structural member of claim 22, wherein said notch and said bar extend substantially the entire length of said solid structural member.

30. A load supporting reinforced structural member, comprising:

a solid structural member of plastic having a surface defining a major plane, said solid structural member having a lengthwise dimension;

a notch formed in said solid structural member extending inwardly with respect to said major plane and having a side edge extending perpendicular to said major plane, said notch being elongated along said lengthwise dimension of said solid structural member; and an untensioned reinforcing bar formed from wood and having characteristics of resilience and compressibility different from those of said solid structural member, said bar being inserted in said notch and being substantially complementary in shape to said notch, and said bar also being elongated along said lengthwise dimension of said solid structural member, said reinforced structural member is less subject to deformation and has greater resilience than either said solid structural member or said reinforcing bar alone.

31. A load supporting reinforced structural member, comprising:

a solid structural member of plastic having a surface defining a major plane, said solid structural member having a lengthwise dimension;

a notch formed in said solid structural member extending inwardly with respect to said major plane and having a side edge extending perpendicular to said major plane, said notch being elongated along said lengthwise dimension of said solid structural member;

an untensioned reinforcing bar formed from a material having characteristics of resilience and compressibility different from those of said solid structural member, said bar being inserted in said notch and being substantially complementary in shape to said notch, and said bar also being elongated along said lengthwise dimension of said solid structural member, said reinforced structural member is less subject to deformation and has greater resilience than either said solid structural member or said reinforcing bar alone; and locking means for locking said reinforcing bar into said notch.

32. The reinforced structural member of claim 31, wherein said locking means comprises a plurality of holes through said solid structural member on either side of said notch, a plurality of holes formed in said reinforcing bar in alignment with said holes in said solid structural member, and a plurality of fasteners inserted into said holes through said solid structural member and said reinforcing bar.

33. A load supporting reinforced structural member, comprising:

a solid structural member of plastic having an outer surface and a lengthwise dimension;

a notch formed in said solid structural member extending inwardly from said outer surface and having a side edge extending perpendicular to said outer surface, said notch being elongated along said lengthwise dimension of said solid constructional member; and an untensioned reinforcing bar formed from a material having characteristics of resilience and compressibility different from those of said solid structural member, said bar being inserted in said notch and being substantially complementary in shape to said notch, and said bar also being elongated along said lengthwise dimension of said solid constructional member, said reinforced structural member is less subject to deformation and has greater resilience than either said solid structural member or said reinforcing bar alone; and locking means for locking said reinforcing bar into said notch.

34. The reinforced structural member of claim 33, wherein said locking means comprises a plurality of holes through said solid structural member on either side of said notch, a plurality of holes formed in said reinforcing bar in alignment with said holes in said solid structural member, and a plurality of fasteners inserted into said holes through said solid structural member and said reinforcing bar.

35. A load supporting reinforced structural member, comprising:

a solid structural member of plastic having an outer surface, said solid structural member having a lengthwise dimension, at least some of said plastic being recycled plastic;

a notch formed in said solid structural member extending inwardly from said outer surface, said notch being elongated along said lengthwise dimension of said solid structural member;

an untensioned metal reinforcing bar having characteristics of resilience and compressibility different from those of said solid structural member, said bar being inserted in said notch and being substantially complementary in shape to said notch, and said bar also being elongated along said lengthwise dimension of said solid structural member, said reinforced structural member is less subject to deformation and has greater resilience than either said solid structural member or said reinforcing bar alone; and locking means for locking said reinforcing bar into said notch.

36. The reinforced structural member of claim 26, wherein said locking means comprises a plurality of holes said solid constructional member on either side of said notch, a plurality of holes formed in said reinforcing bar in alignment with said holes in said solid constructional member, and a plurality of fasteners inserted into said holes through said solid constructional member and said reinforcing bar.

* * * * *